Oct. 27, 1936.     L. N. YOHE     2,058,934
PLANT RECEPTACLE
Filed June 27, 1935     2 Sheets-Sheet 1
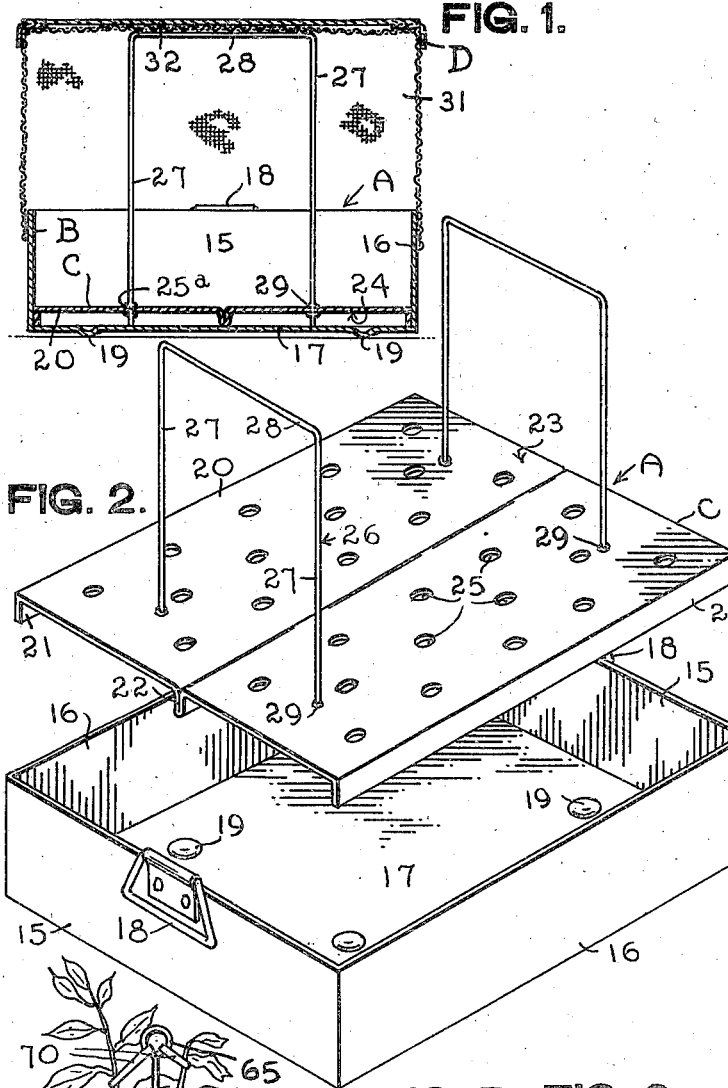
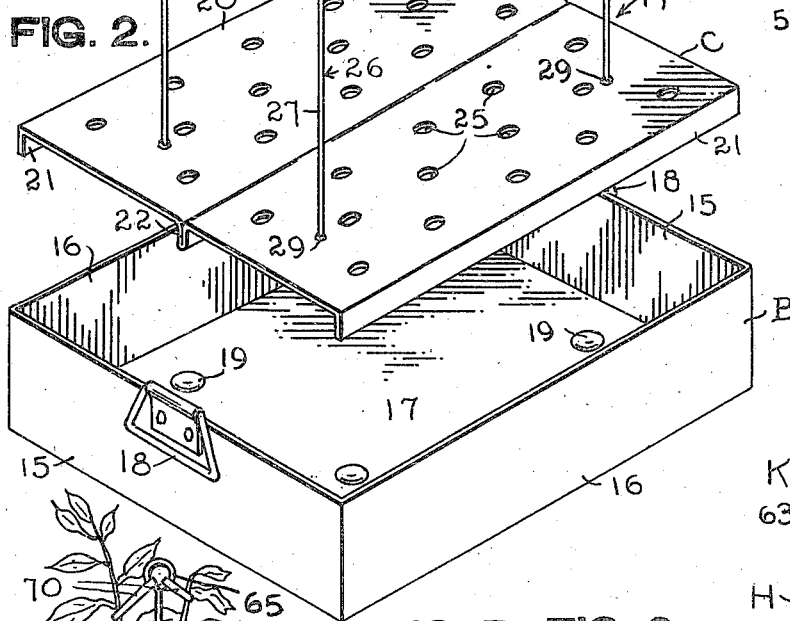
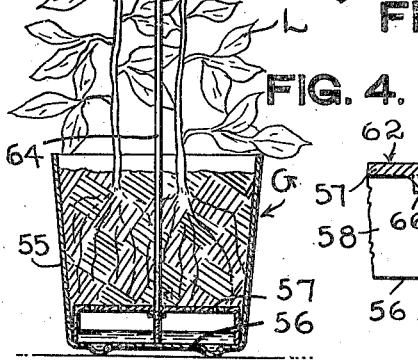
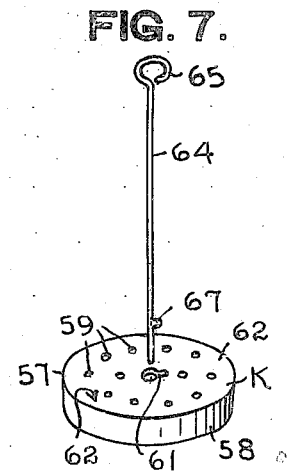
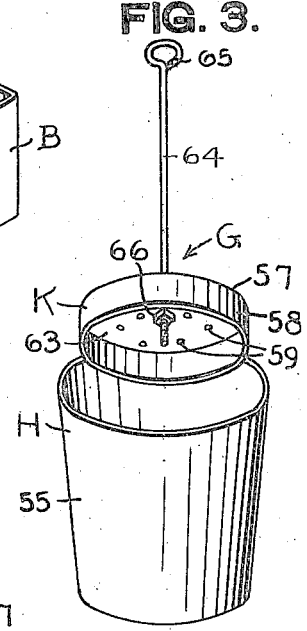
INVENTOR,
Lester N. Yohe
BY Lancaster, Allwine and Rommel
ATTORNEYS.

Oct. 27, 1936.    L. N. YOHE    2,058,934
PLANT RECEPTACLE
Filed June 27, 1935    2 Sheets-Sheet 2
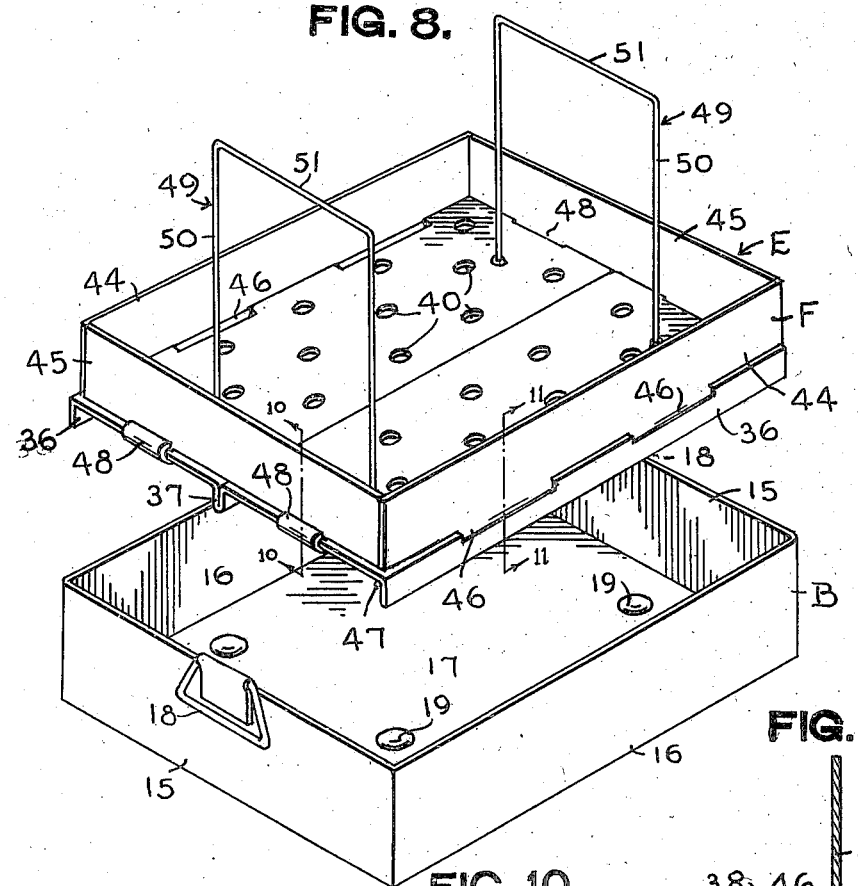
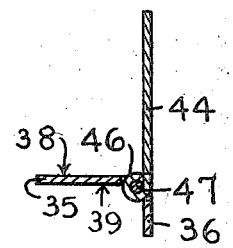
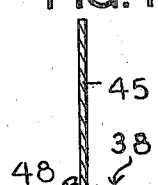
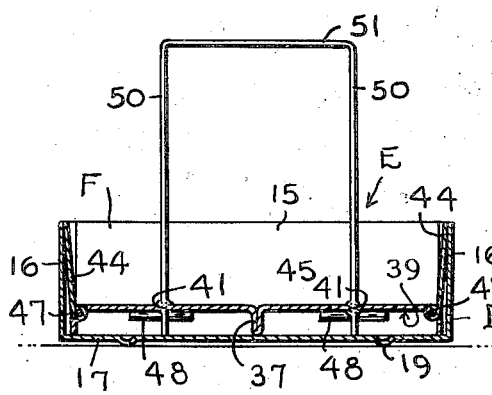
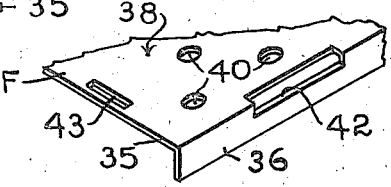
INVENTOR.
Lester N. Yohe
BY
Lancaster, Allwine and Rommel
ATTORNEYS.

Patented Oct. 27, 1936

2,058,934

UNITED STATES PATENT OFFICE 2,058,934

PLANT RECEPTACLE

Lester N. Yohe, Gettysburg, Pa.

Application June 27, 1935, Serial No. 28,713

6 Claims. (Cl. 47—38)

This invention relates to plant receptacles employed in plant husbandry, and more particularly to a novel receptacle having a false bottom structure, whereby the plant or plants within the receptacle may be removed from the receptacle and also removed from the false bottom thereof without disturbing their roots or the soil about their roots.

While the novel receptacles disclosed may be employed for what is commonly termed potted plants, an important use is as a seed flat, wherein seeds are planted and when they have sprouted and the plants have grown to a desired size, these plants may be removed from the receptacles without disturbing their roots or the soil about their roots. In using ordinary seed flats, this disturbance is almost certain to occur and, as a result, the young plants are frequently killed or their growth set back very materially.

Another object of the invention is to provide a plant receptacle including handle-like members, having dual functions.

Another object is the provision of a novel plant receptacle having a false bottom with which the plant may be removed from the container in order to examine root growths or to more easily combat enemies attacking the roots.

Still another object is to provide a novel false bottom for plant receptacles.

Yet another object is to provide a plant receptacle having a false bottom which may be manufactured at a relatively low cost.

Other objects and advantages of the invention will be apparent during the course of the following detailed description, taken in connection with the accompanying drawings, forming a part of this specification and in which drawings:—

Figure 1 is a vertical section through one embodiment of the novel plant receptacle (employed as a seed flat), wherein handle members provide a support for covering for the receptacle.

Figure 2 is a perspective view of the embodiment of the plant receptacle shown in Figure 1.

Figure 3 is a perspective view of another embodiment of plant receptacle (adapted particularly to be employed as a flower pot).

Figure 4 is a vertical section through the embodiment of the plant receptacle shown in Figure 3.

Figures 5 and 6 are fragmentary sectional views showing methods of detachably securing handle members to particularly the false bottom of the plant receptacle shown in Figures 3 and 4.

Figure 7 shows the method of inserting the detachable handle member illustrated in Figure 6, into a false bottom.

Figure 8 is a perspective view of another embodiment of the novel plant receptacle, showing a drop-walled false bottom.

Figure 9 is a transverse section through the assembled plant receptacle shown in Figure 8.

Figures 10 and 11 are fragmentary views upon their respective lines of Figure 8.

Figure 12 is a fragment of a corner of the false bottom shown in Figure 8, with the drop walls removed.

In the drawings, wherein for the purpose of illustration are shown several embodiments of the invention, and wherein similar reference characters designate corresponding parts throughout the several views, the letter A illustrates one embodiment of the novel plant receptacle comprising a container B and false bottom structure C, the letter D a covering for the same, the letter E a second embodiment of the novel plant receptacle comprising a container similar to B and a false bottom structure F, the letter G a third embodiment of the novel plant receptacle comprising the container H and the false bottom structure K, while the letter L designates plants growing in the plant receptacle G.

The plant receptacle A is shown, by way of example, as a seed flat but need not be limited to use in raising plants from seeds.

As for the container B, this preferably has paralleling end walls 15 and paralleling side walls 16, joined at their corners and joined to a fixed bottom 17. Handles 18 may be provided and secured to the end or side walls in any approved manner. With this construction, an openmouthed container is provided having high or low end and side walls and wide or narrow end walls as desired.

Means may be provided for raising the container B above the ground or a surface adapted to receive it by the provision of a suitable number of projections 19 extending downwardly from the lower face of the fixed bottom 17. These may be formed, if desired by upsetting a portion of the fixed bottom, if of suitable material, so that a space will be provided between the container B and the surface adapted to receive it, permitting the circulation of air and preventing the formation of mildew and other growths.

The false bottom structure C includes a bottom member 20 which is preferably a sheet of suitable metal and this may have downturned side portions 21 and be bent along its longitudinal medial line to form a dual downturned portion 22. However, with the novel construction disclosed, these downturned portions are not essential features, except when the false bottom member is of light metal, inclined to sag under the weight of the soil. Extending from the upper face 23 to the lower face 24 of the false bottom member 20, are a suitable number of spaced apart perforations 25, providing drain holes. The bottom member 20 is also provided with a plurality of handle-accommodating perforations 25a which, as may be seen from Figures 1 and 2, are spaced well inwardly of all of the edges of the false bottom member 20 and are so disposed that they are in pairs with a pair to each side of the longitudinal medial line of the false bottom member 20.

Extending through these perforations 25a are handle members or portions 26 which, preferably, comprise lengths of heavy wire or light rods, bent to form arms 27 substantially paralleling each other and a bight portion 28. Preferably, the length of each arm 27 is such that it will extend through a perforation 25a with its free end resting upon the fixed bottom 17 and its opposite end above the mouth of the container B, as clearly shown in Figure 1. These handle members 26 may be soldered to the false bottom member 20, as shown at 29. Thus, while these handle members 26 are essentially handles adapted to be grasped in order to lower the false bottom structure C into the container B, or to remove it from the container B, the handles have other functions, for their free ends, resting upon the fixed bottom 17 of the container B, support the false bottom. In addition to this, they support a covering for the receptacle A, one example of which is next described.

The covering D may be the conventional cheese cloth or netting 31 employed to shield young plants from the sun, birds, insects, wind and rain, and this may be draped over the bight portions 28 of the handle members 26 to hang over the plant receptacle A and meet the walls 16 and 17 of the container B. If desired, the handle members 26 may also support, at the same time or separately, the conventional slatted covering structure 32, frequently employed to shade plants from the sun. As shown in Figure 1, the cheese cloth or netting 31 is combined with the slatted covering structure 32, a combination frequently employed.

Now, referring to the novel receptacle E, in addition to the container which is shown substantially similar to the container B of the plant receptacle A, the plant receptacle E comprises a false bottom structure F.

The false bottom structure F includes a false bottom member 35 which is, like the false bottom member 20, of sheet metal of a suitable gauge and may have downturned side portions 36 and be bent along its longitudinal medial line to form a dual downturned portion 37. However, as before stated, these downturned portions are not essential features, except when the false bottom member 35 is of light metal, inclined to sag under the weight of the soil. Extending from the upper face 38 to the lower face 39 of the false bottom member 35 are a suitable number of spaced apart perforations 40, providing drain holes. The body member 35 is also provided with a plurality of handle accommodating perforations 41, spaced well inwardly of all of the edges of the false bottom member 35 and disposed substantially similar to the perforations 25a of the false bottom member 20.

By referring to Figure 12, it may be seen how the false bottom member 35 is also slotted in order to hingedly carry end and side walls. Extending along the side portions of the false bottom member 35 are preferably a suitable number of slots 42 cut partly into the false bottom and its downturned portions 36. Preferably, the false bottom member 35, adjacent its end edges, is also suitably slotted as at 43. If the false bottom member 35 is not provided with the downturned portions 36, then the slots 43 will be employed along the side edges of the false bottom member 35.

The drop walls of the false bottom structure F preferably comprise side walls 44 and end walls 45. Their height is such that, when the false bottom structure F is disposed within the container B, their top edges will be substantially flush with the top edges or mouth of the container B.

The drop side walls 44 have inturned knuckles 46 accommodated in the slots 42, while a suitable pin or pintle 47 extending through the knuckles from the under side of the false bottom member 35 provides pivots.

Outturned knuckles 48 on the drop end walls 45 extend through the slots 43, the narrow portions of the false bottom member 35 between the slots 43 and the edges of the former acting as pintles or pivots.

Extending through the perforations 41 are handle members or portions 49, preferably similar to the handle portions 26 associated with the false bottom structure C. That is, they may comprise lengths of heavy wire or light rods bent to form arms 50, substantially paralleling each other, and a bight portion 51 connecting the arms. Preferably, the length of each arm 50 is such that it will extend through a perforation 41 with its free end resting upon the fixed bottom of the container B. The opposite, or bight carrying ends, of the arms 50 extend above the mouth of the container B, as shown in Figure 9. These handle members 49 may be soldered or otherwise suitably secured to the false bottom member 35.

Now with reference to the plant receptacle G, shown in Figures 3 to 7, this has many of the same features as the plant receptacles A and E, but it is particularly applicable as a receptacle for one or a few potted plants.

The container H is illustrated as quite similar to a conventional clay flower pot or bowl, and includes an outer wall 55 and a fixed bottom 56. It may be of metal, baked clay, china, glass or any suitable material relatively unaffected by moisture.

As for the false bottom structure K, this includes a false bottom member 57 which may have a downturned rim 58 and be provided with a plurality of spaced apart drain perforations 59 and an axially disposed perforation 60 or key hole 61, both extending from its upper face 62 to its lower face 63.

Extending through the perforations 60 or key hole 61 is a handle member or portion 64 which preferably comprises a length of heavy wire or light rod bent at its upper end to form an eye or hand grip 65 and with its opposite end provided with a portion of a means to detachably secure it to the false bottom member 57.

Referring to Figures 3 and 5, it will be seen that the lower end of the handle member 64 is screw threaded at its lower end to accommodate a nut 66 which may be disposed in abutment with the lower face 63 of the false bottom member 57. Preferably, this nut 66 is welded or soldered to the lower face 63, but may be loose.

Now referring to Figures 6 and 7, it will be seen that the handle member 64 may be detachably connected with the false bottom member 57 by providing a radially extending lug or projections 67 on the handle portion 64 so disposed that the lug may pass through the key hole 61 and the handle portion 64 be turned in order that the lug 67 will come into contact with the lower face 63 of the false bottom member 57.

In either case, it is important that when the false bottom member 57 is disposed within the container H, that the free end of the handle portion 64 abuts the bottom 56 of the container H, as shown in Figure 4. The opposite end of the handle portion 64 projects upwardly and through the mouth of the container H, also substantially as shown in Figure 4.

Even if the false bottom structure K is not provided with the downturned rim 58, the free end of the handle portion 64 will space the false bottom member 57 from the fixed bottom 56 of the container H, but when the false bottom member 57 is of very light metal, it is desirable to provide the additional support of the downturned rim 58.

Plants L in the plant receptacle G may be supported by suitable bands 70 looped about the plants and the eye 65 of the handle portion 64, as shown in Figure 4.

It will be seen that each of the forms shown has, preferably, a handle portion spaced from the edge of a false bottom and extending to the fixed bottom of a container, and that these handle portions have functions other than being mere handles.

Spacing the handles inwardly of the edges of the several false bottoms allows the false bottom structures to be removed easily, for it is found that when spaced at the edges of the false bottoms, handles cause the false bottom structures to catch on and hold to the walls of the containers for, of necessity, it is important that there be a fairly tight fit between the edges of the false bottoms and the walls of the containers.

In the use of the several forms shown, plants grown therein may be removed without disturbing their roots or the soil about their roots since, when the false bottom structures are lifted out of their containers, a suitable tool, such as a knife or spatula may be inserted between the false bottom and the soil and the soil adhering to the false bottom be loosened therefrom. Then the tool may be employed to cut downwardly through the soil about a plant so that a block of soil will be about each plant as it is removed for transplanting. Particularly, this first act is important since the side and end walls of a conventional seed flat or box prevent it and as a result, when it is attempted to remove a plant, the soil adhering to the bottom crumbles and carries with it the soil immediately above, breaking and exposing the root and frequently seriously damaging the plant.

The drop walled false bottom structure shown in form E is particularly desirable where valuable plants or plants with delicate root growths are grown, since there is both protection for the sides and bottom of the soil bed about the root and, since the walls 44 and 45 will drop downwardly out of the way when the false bottom structure F is removed from the container B, the plants themselves may be separated as heretofore explained without injuring the roots at all.

In the use of the plant receptacle G shown particularly in Figures 3 to 7, when it is desired to remove the plant or plants therein, all that is necessary is to lift out the plant still upon the false bottom, remove the handle portion 64 by rotating it out of engagement with the false bottom 57 and slip the entire plant with its adhering earth from the false bottom by a horizontal movement, thus obviating damaging the plant at all.

Of course, the false bottom structures disclosed afford a space at the bottom of the plant receptacle for the drainage of water, a feature recognized as important in the growing of plants, since an excess of water about the roots of plants frequently causes the roots to decay. By the construction shown, this drained water, will in time, be carried by evaporation back to the soil and utilized by the plants.

Various changes may be made to the forms of invention herein shown and described without departing from the spirit of the invention or the scope of the claims.

What is claimed is:

1. In a plant receptacle, an open-mouthed container, a false bottom therein with its edge closely adjacent the inner face of the outer wall of said container, and a handle for said false bottom, said handle protruding from the mouth of said container at a point well inwardly of the edges of said mouth, the extent to which said handle projects from said mouth being sufficient to space a covering, disposed upon the free end of said handle, a sufficient distance from said mouth so that said covering will extend about a growing plant disposed upright within said receptacle.

2. In a plant receptacle, an open-mouthed container having a bottom and an upwardly extending outer wall, a false bottom disposed in spaced relation with the bottom of said container, and a handle member secured to and projecting through said false bottom, said handle member extending in one direction towards and outwardly beyond the mouth of said container and in the other direction into abutment with the bottom of said container, the extent said handle member projects outwardly beyond the mouth of said container being at least equal to the height of said outer wall.

3. In a plant receptacle, an open mouthed container having an outer wall and a fixed bottom, a false bottom disposed in spaced relation with said fixed bottom, and a handle secured to said false bottom, said handle comprising a pair of upwardly extending arms spaced from each other and spaced from said outer wall, said arms being joined by a bight portion disposed in substantial parallelism with said false bottom and also disposed outwardly of the mouth of said container.

4. In a plant receptacle, an open mouthed container having an outer wall and a fixed bottom, a false bottom disposed in spaced relation with said fixed bottom, and a handle member secured to said false bottom, said handle member comprising a pair of upwardly extending arms spaced from each other and spaced from said outer wall, said arms being joined by a bight portion disposed in substantial parallelism with said false bottom and also disposed outwardly of the mouth of said container, said arms extending upwardly beyond the mouth of said container a distance at least equal to the height of said wall, and the free ends of said arms being in contact with the fixed bottom of said container.

5. As an article of manufacture, a false bottom for plant receptacles, comprising a false bottom member adapted to extend over the fixed bottom of a plant receptacle, said false bottom member having a handle portion disposed well inwardly of the entire edge of said false bottom and comprising a pair of spaced apart arms secured adjacent their free ends to said false bottom member and extending upwardly, away from said false bottom, the length of said arms being such that they will extend outward of the mouth of said plant receptacle when said false bottom member is disposed therein, said handle portion also including a bight portion joining said arms, whereby said handle portion serves both as a handle for removing and replacing said false bottom member from and into said receptacle and as a support for a covering disposed over said plant receptacle and spaced from the mouth of said plant receptacle outwardly of the edges thereof.

6. As an article of manufacture, a false bottom for plant receptacles, comprising a false bottom member adapted to extend over the fixed bottom of the plant receptacle, said false bottom member having a handle portion disposed well inwardly of the entire edge of said false bottom and comprising a wire arm secured adjacent one end of said false bottom member, and extending downwardly in one direction and extending upwardly, in the other direction, away from said false bottom, the length of said wire arm being such that it will extend out of the mouth of said plant receptacle when said false bottom is disposed therein, said handle portion also including a hand grip at the upwardly extending end of said arm, whereby said handle portion serves both as a handle for removing and replacing said false bottom member from and into said receptacle and as a support for a covering disposed over said plant receptacle and spaced from the mouth of said plant receptacle and outwardly of the edges thereof.

LESTER N. YOHE.